United States Patent [19]

Ishibashi et al.

[11] Patent Number: 4,939,049

[45] Date of Patent: Jul. 3, 1990

[54] NON-AQUEOUS ELECTROLYTE CELL AND METHOD OF PRODUCING THE SAME

[75] Inventors: Chikanori Ishibashi, Yawata; Kazuro Moriwaki; Toshihiko Saito, both of Kyoto; Nobuhiro Furukawa, Hirakata, all of Japan

[73] Assignee: Sanyo Electric Co., Ltd., Osaka, Japan

[21] Appl. No.: 267,594

[22] Filed: Nov. 7, 1988

[30] Foreign Application Priority Data

Nov. 20, 1987 [JP] Japan .................. 62-294331
Jul. 25, 1988 [JP] Japan .................. 63-184801

[51] Int. Cl.$^5$ .............................................. H01M 6/14
[52] U.S. Cl. .................... 429/194; 429/218; 429/220
[58] Field of Search ............... 429/194, 218, 220; 252/182.1; 423/641, 604

[56] References Cited

U.S. PATENT DOCUMENTS 3,960,595  6/1976  Lehmann ..................... 136/6
4,833,050  5/1989  Whitney et al. ............ 429/194

FOREIGN PATENT DOCUMENTS 51-122729  10/1976  Japan .

Primary Examiner—Anthony Skapars
Attorney, Agent, or Firm—Armstrong, Nikaido, Marmelstein, Kubovcik & Murray

[57] ABSTRACT

A non-aqueous electrolyte cell is disclosed. As main components thereof, are employed a positive electrode having as an active material copper oxide which is obtained by pyrolyzing copper hydroxide prepared by mixing an aqueous solution of copper salt and an aqueous solution of alkali hydroxide, a negative electrode having as an active material lithium or lithium alloy and a non-aqueous electrolyte.

A method of manufacturing a non-aqueous electrolyte cell is also disclosed. The method comprises a first step of producing copper hydroxide by mixing an aqueous solution of copper salt and an aqueous solution of alkali hydroxide and causing chemical reaction between the two, a second step of producing copper oxide by pyrolyzing the above copper hydroxide, and a third step of manufacturing a positive electrode employing the above copper oxide as an active material for the positive electrode.

6 Claims, 1 Drawing Sheet

NON-AQUEOUS ELECTROLYTE CELL AND METHOD OF PRODUCING THE SAME

BACKGROUND OF THE INVENTION (1) Field of the Invention

The present invention relates to a non-aqueous electrolyte cell comprising a negative electrode formed of lithium or lithium alloy, a positive electrode having copper oxide as an active material and a non-aqueous electrolyte and to a method of producing the same. More particularly it relates to the positive electrode and a method of producing the same.

(2) Description of the Prior Art

A non-aqueous electrolyte cell in which the negative electrode is formed of lithium or lithium alloy provides the advantages of high energy density and low self-discharge rate, and therefore, it is considered to be much more useful in the future. In this cell, the cell voltage is about 1.5V where the positive electrode has CuO as the active material. Since this feature provides the advantage of compatibility with a conventional cell such as alkaline dry cell, mercury cell or silver cell, reseach has been actively pursued in this field in recent years.

However, this type of cell has the problem of a voltage drop at the initial discharge state (hereinafter referred to as initial voltage drop) during high rate discharge.

SUMMARY OF THE INVENTION

A primary object of the present invention, therefore, is to provide a non-aqueous electrolyte cell capable of preventing an initial voltage from dropping during high rate discharge and to provide a method of producing the same.

Another object of the present invention is to provide a non-aqueous electrolyte cell capable of preventing the cell voltage from lowering even after a long discharge period and to provide a method of producing the same.

A further object of the present invention is to provide a non-aqueous electrolyte cell allowing simple manufacturing process and to provide a method of producing the same.

The above objects are fulfilled according to the present invention by a non-aqueous electrolyte cell comprising a positive electrode having as an active material copper oxide which is obtained by pyrolyzing copper hydroxide prepared by mixing an aqueous solution of copper salt and an aqueous solution of alkali hydroxide, a negative electrode having lithium or lithium alloy as an active material, and a non-aqueous electrolyte.

The above objects are fulfilled also by a method of manufacturing a non-aqueous electrolyte cell comprising a first step of producing copper hydroxide by mixing an aqueous solution of copper salt and an aqueous solution of alkali hydroxide and causing chemical reaction between the two, a second step of producing copper oxide by pyrolyzing the above copper hydroxide, and a third step of manufacturing a positive electrode employing the above copper oxide as an active material for the positive electrode.

In the cell noted above, the copper salt may comprise copper sulfate and the alkali hydroxide may comprise lithium hydroxide.

In the cell noted above, the copper salt may also comprise copper nitrate and the alkali hydroxide may also comprise lithium hydroxide.

In the method noted above, the copper salt may comprise copper sulfate and the alkali hydroxide may comprise lithium hydroxide.

In the method noted above, the copper salt may also comprise copper nitrate and the alkali hydroxide may also comprise lithium hydroxide.

The copper oxide may be produced in the second step by pyrolyzing the copper hydroxide by means of heat treatment in a temperature range of 400°–600° C.

The above objects are fulfilled for the following reasons:

Where an aqueous solution of copper salt and an aqueous solution of alkali hydroxide are mixed, particles of copper hydroxide [$Cu(OH)_2$] having a uniform particle diameter precipitate. This reaction is expressed by the following reaction formula (1) provided that an aqueous solution of $CuSO_4$ is employed as the aqueous solution of copper salt and KOH as alkali hydroxide.

$$CuSO_4 + 2KOH \rightarrow Cu(OH)_2 + K_2SO_4 \quad (1)$$

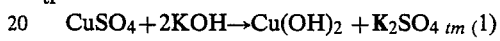

$Cu(OH)_2$ thus obtained is pyrolyzed to obtain CuO having a uniform fine particle diameter and high porosity. This reaction is expressed by the following formula (2).

$$Cu(OH)_2 \rightarrow CuO + H_2O \quad (2)$$

Since CuO having high porosity obtained through the above process is excellent in liquid absorption rate, an electrolyte permeates into a positive electrode sufficiently before the discharge. As a result, discharge reaction takes place smoothly from the beginning. Accordingly, with a load of $1K\Omega$, the initial voltage during the discharge does not drop and at the same time the operation voltage remains at about 1.35V.

Particularly, where an aqueous solution of $CuSO_4$ or $Cu(NO_3)_2$ is employed as the aqueous solution of copper salt and lithium hydroxide as alkali hydroxide, the above effect becomes more remarkable. This is considered due to the following reason.

Where the aqueous solutions of $CuSO_4$ and LiOH are employed, and where the aqueous solutions of $Cu(NO_3)_2$ and LiOH are employed, the reactions occur as expressed by the following formulas, respectively.

$$CuSO_4 + 2LiOH \rightarrow Cu(OH)_2 + Li_2SO_4 \quad (3)$$

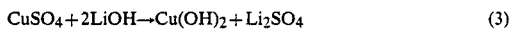

$$Cu(NO_3)_2 + 2LiOH \rightarrow Cu(OH)_2 + 2LiNO_3 \quad (4)$$

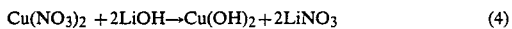

In the above formulas (3) and (4), when $Cu(OH)_2$ is formed and precipitates, Li ions ($Li^+$) are placed near hydroxyl ions ($OH^-$) and migrate with the hydroxyl ions. Therefore, the reaction expressed by the following formula (5) occurs, resulting in $Cu(OH)_2$ containing Li ions inside thereof uniformly.

$$Cu(OH)_2 + xLi \rightarrow Li_xCu(OH)_2 \quad (51)$$

Further, the reaction expressed by the following formula (6) occurs by pyrolyzing $Li_xCu(OH)_2$, resulting in CuO containing Li ions inside thereof uniformly.

$$Li_xCu(OH)_2 \rightarrow Li_xCuO + H_2 \quad (5)$$

As seen from the above description, CuO thus obtained has a crystal structure inside which Li permeates, thereby promoting diffusion of Li inside CuO from the beginning to the end of the discharge. As a result, during the high rate discharge, the initial voltage is prevented from dropping and the lowering of the cell voltage is prevented even after a long discharge period.

Where $Cu(OH)_2$ is pyrolyzed at a temperature of 400°-600° C., the above effect becomes more remarkable. This is due to the fact that, when the pyrolyzing temperature is less than 400° C., the reaction expressed by the above formula (2) does not occur sufficiently and the residual $Cu(OH)_2$ leads to the decrease in discharge capacity, while, when the pyrolyzing temperature is more than 600° C., CuO having a fine particle diameter cohere or dissolve to form CuO having a large particle diameter, resulting in low porosity.

In addition, as the heat-treatment temperature in producing CuO is at most 600° C., high temperature of about 900° C. as in the case where Cu is oxidized to obtain CuO is not required. This allows simple manufacturing process.

In producing CuO, because both copper salt and alkali hydroxide are mixed in the state of aqueous solutions, the mixing is effected completely. Accordingly, CuO excellent in uniformity can be obtained.

DESCRIPTION OF THE PREFERRED EMBODIMENTS

Figure 1:
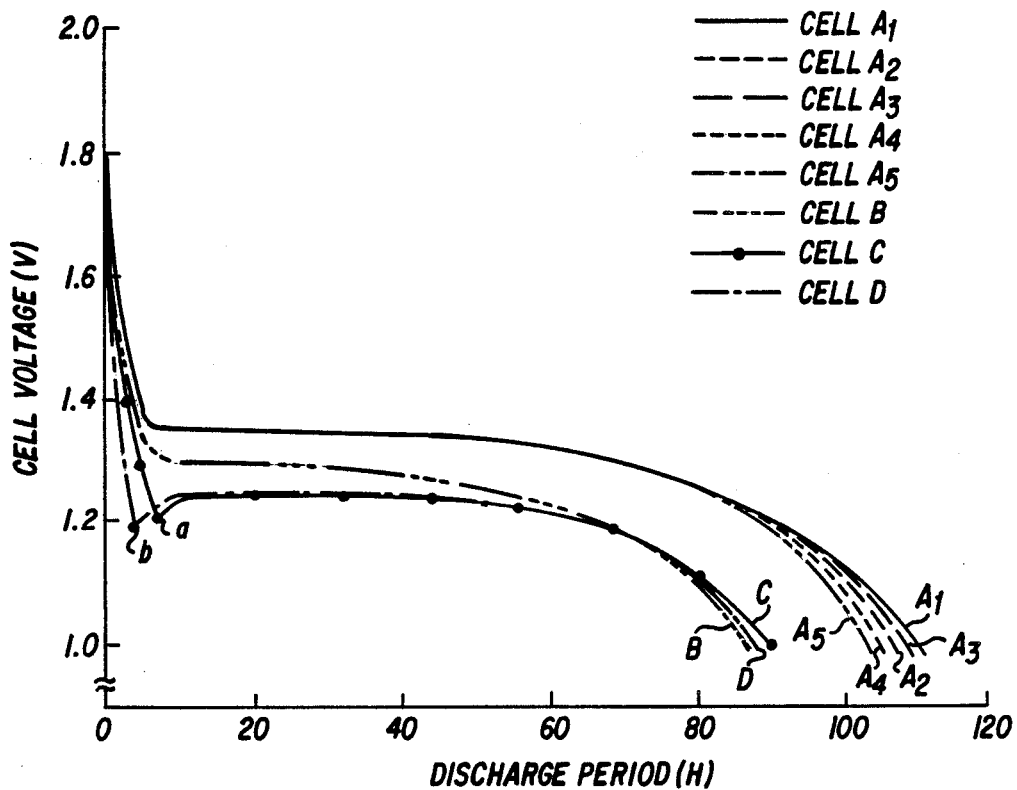
FIG. 1 is a graph showing discharge characteristics of cells A1-A5 according to the present invention and comparative cells B-D.

An embodiment of the present invention will be described hereinafter.

[EMBODIMENT 1]

First, 250 cc of a 1 mol/l aqueous solution of $CuSO_4$ and 500 cc of a 1 mol/l aqueous solution of LiOH were mixed and left for several hours to precipitate $Cu(OH)_2$ containing Li. Next, the precipitate was heat treated in a temperature range of 400°-600° C. for 24 hours to produce CuO containing Li (hereinafter called $Li_xCuO$) after being washed with water. Thereafter, 90 wt % of $Li_xCuO$ was mixed with 5 wt % of graphite acting as a conductive agent and 5 wt % of fluororesin powder acting as a binder, and the resulting mixture was molded under a pressure of about 2 ton/cm² to obtain a product 15.0 mm in diameter and 1.1 mm in thickness. Finally, this product was heat treated in a temperature range of 200°-300° C. to manufacture a positive electrode.

On the other hand, a negative electrode was manufactured by rolling a lithium plate to a thickness of 0.6 mm and punching a piece having a diameter of 15.0 mm out of the rolled plate.

A flat type non-aqueous electrolyte cell having a diameter of 20.0 mm and a thickness of 2.5 mm was manufactured by employing the above positive and negative electrodes and a separator made of nonwoven fabric.

The electrolyte was prepared by dissolving a 1 mol/l lithium perchlorate in a solvent mixture of propylene carbonate and 1,2-dimethoxyethane.

The cell thus obtained is referred to as cell A1 of the present invention hereinafter.

[EMBODIMENT 2]

500 cc of a 1 mol/l aqueous solution of $CuSO_4$ was added with a 1l of a 1 mol/l aqueous solution of KOH to precipitate $Cu(OH)_2$. Then, the precipitate was heat treated at a temperature of 400° C. for 24 hours to produce CuO after being washed with water.

A cell was manufactured in the same way as Embodiment 1 except that the above CuO was employed as an active material for the positive electrode. The cell thus obtained is referred to as cell A2 of the present invention hereinafter.

[EMBODIMENT 3]

500 cc of a 1 mol/l aqueous solution of $Cu(NO_3)_2$ was added with a 1l of a 1 mol/l aqueous solution of KOH to precipitate $Cu(OH)_2$. Then, the precipitate was heat treated at a temperature of 400° C. for 24 hours to produce CuO after being washed with water.

A cell was manufactured in the same way as Embodiment 1 except that the above CuO was employed as an active material for the positive electrode. The cell thus obtained is referred to as cell A3 of the present invention hereinafter.

[EMBODIMENT 4]

500 cc of a 1 mol/l aqueous solution of $CuCl_2$ was added with a 1l of a 1 mol/l aqueous solution of KOH to precipitate $Cu(OH)_2$. Then, the precipitate was heat treated at a temperature of 400° C. for 24 hours to produce CuO after being washed with water.

A cell was manufactured in the same way as Embodiment 1 except that the above CuO was employed as an active material for the positive electrode. The cell thus obtained is referred to as cell A4 of the present invention hereinafter.

[EMBODIMENT 5]

500 cc of a 1 mol/l aqueous solution of $CuSO_4$ was added with a 1l of a 1 mol/l aqueous solution of NaOH to precipitate $Cu(OH)_2$. Then, the precipitate was heat treated at a temperature of 400° C. for 24 hours to produce CuO after being rinsed with water.

A cell was manufactured in the same way as Embodiment 1 except that the above CuO was employed as an active material for the positive electrode. The cell thus obtained is referred to as cell A5 of the present invention hereinafter.

[COMPARATIVE EXAMPLE 1]

CuO containing Li was produced by pyrolyzing the mixture of $CuCO_3$ and $Li_2O$. A cell was manufactured in the same way as Embodiment 1 except that CuO containing Li thus obtained was employed as an active material for the positive electrode. The cell thus obtained is referred to as comparative cell B hereinafter.

[COMPARATIVE EXAMPLE 2]

CuO was produced by pyrolyzing commercially available special grade $Cu(OH)_2$. A cell was manufactured in the same way as Embodiment 1 except that the above CuO was employed as an active material for the positive electrode. The cell thus obtained is referred to as comparative cell C hereinafter.

[COMPARATIVE EXAMPLE 3]

CuO was produced by oxidizing Cu at a temperature of about 900° C. A cell was manufactured in the same way as Embodiment 1 except that the above CuO was employed as an active material for the positive electrode. The cell thus obtained is referred to as comparative cell D hereinafter.

[EXPERIMENT 1]

Discharge characteristics of the cells A1-A5 of the present invention and the comparative cells B-D were checked and the results are shown in FIG. 1. The discharge characteristics were investigated under a load of 1KΩ at 25° C. All of the cells had been discharged prior to the test in about 4% of discharge capacities in order to lower open circuit voltages.

As apparent from FIG. 1, the comparative cells C and D have initial voltages dropping sharply during the discharge (as indicated by a and b in the drawing) and mid-term voltages (correpond to voltages after discharge for 20 hours-60 hours) dropping to 1.25V. In addition, it is understood that the cell voltages drop to 1.0V after 90 hours' discharge. The comparative cell B does not show initial voltage drop, but the cell voltage drops to 1.25V after 60 hours' discharge as in the case of cells C and D. Further, the cell voltage of cell B drop to 1.0V after 90 hours' discharge.

By contrast, initial voltages of the cells A1-A5 of the present invention do not drop during the discharge and maintain at 1.3V until 60 hours' discharge. Further, the cell voltages do not drop to 0V until the cells were discharged for 110 hours. It will be seen that the cells A1-A5 of the present invention are remarkably improved in high rate discharge characteristics compared with the comparative cells B-D.

[EXPERIMENT 2]

Figure 2:
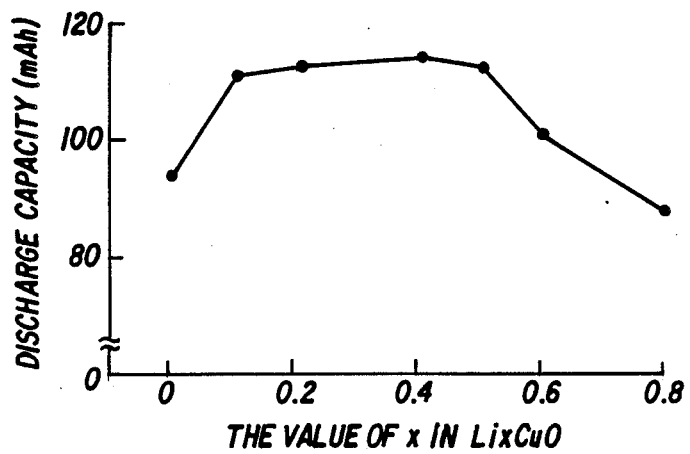
FIG. 2 is a graph showing discharge capacity when the value of x in $Li_xCuO$ is varied.

Discharge capacity of CuO containing Li, i.e., Li$_x$CuO obtained in Embodiment 1 was measured by varying the value of x and the result is shown in FIG. 2. The discharge characteristics were investigated under a load of 1KΩ at 25° C.

As apparent from FIG. 2, the discharge capacity is 110 mAh or more when x is in a range of 0.1-0.5, while it is less than 100 mAh when x is 0 or in a range of 0.6-0.8. This is considered due to the fact that, when x is 0, that is to say, Li is not contained at all, the effect mentioned above is not produced, whereas, when x is 0.6 or more, CuO acting as the active material is reduced inside the cell, thereby causing decrease in discharge capacity.

Therefore, it is desirable that x is in a range of 0.1-0.5. The value of x was measured by finding the amounts of Li and Cu by atomic absorption method.

In Embodiment 1, Cu(OH)$_2$ was produced by adding the aqueous solution of LiOH into the aqueous solution of CuSO$_4$. The present invention is not limitative to this, but Cu(OH)$_2$ can be produced by adding an aqueous solution of LiOH into an aqueous solution of Cu(NO$_3$)$_2$.

What is claimed is:

1. A non-aqueous electrolyte cell comprising:
   a positive electrode having as an active material copper oxide containing lithium obtained by pyrolyzing copper hydroxide containing lithium prepared by mixing an aqueous solution of copper salt and an aqueous solution of lithium hydroxide;
   a negative electrode having lithium or lithium alloy as an active material; and
   a non-aqueous electrolyte.

2. A cell as claimed in claim 1, said copper salt comprises copper sulfate.

3. A cell as claimed in claim 1, said copper salt comprises copper nitrate.

4. A cell as claimed in claim 1, said copper salt is selected from a group consisting of copper sulfate, copper nitrate and copper chloride.

5. A cell as claimed in claim 1, said the non-aqueous electrolyte is prepared by dissolving lithium perchlorate in a solvent mixture of propylene carbonate and 1,2-demethoxyethane.

6. A cell as claimed in claim 1, said copper oxide containing lithium is expressed by the formula Li$_x$CuO wherein $0.1 \leq X \leq 0.5$.

* * * * *